US009530152B2

(12) United States Patent
Kramer et al.

(10) Patent No.: US 9,530,152 B2
(45) Date of Patent: *Dec. 27, 2016

(54) SELECTING ADVERTISING FOR PRESENTATION WITH DIGITAL CONTENT

(71) Applicant: Amazon Technologies, Inc., Seattle, WA (US)

(72) Inventors: Joshua N. Kramer, Bainbridge Island, WA (US); Cameron S. Janes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,616

(22) Filed: Nov. 13, 2015

(65) Prior Publication Data

US 2016/0071151 A1 Mar. 10, 2016

Related U.S. Application Data

(63) Continuation of application No. 12/915,518, filed on Oct. 29, 2010, now Pat. No. 9,226,042.

(51) Int. Cl.
| | |
|---|---|
| H04N 7/10 | (2006.01) |
| H04N 7/025 | (2006.01) |
| G06Q 30/02 | (2012.01) |
| H04N 21/81 | (2011.01) |
| H04N 7/173 | (2011.01) |
| H04N 7/16 | (2011.01) |
| H04N 21/235 | (2011.01) |
| H04N 21/435 | (2011.01) |
| H04N 21/45 | (2011.01) |

(Continued)

(52) U.S. Cl.
CPC ...... *G06Q 30/0255* (2013.01); *G06Q 30/0275* (2013.01); *H04N 7/165* (2013.01); *H04N 7/17318* (2013.01); *H04N 21/235* (2013.01); *H04N 21/2408* (2013.01); *H04N 21/2547* (2013.01); *H04N 21/25883* (2013.01); *H04N 21/25891* (2013.01); *H04N 21/2668* (2013.01); *H04N 21/435* (2013.01); *H04N 21/44222* (2013.01); *H04N 21/4532* (2013.01); *H04N 21/812* (2013.01); *H04N 21/814* (2013.01); *H04N 21/47815* (2013.01)

(58) Field of Classification Search
None
See application file for complete search history.

(56) References Cited

U.S. PATENT DOCUMENTS

| | | | |
|---|---|---|---|
| 6,757,691 | B1 | 6/2004 | Welsh et al. |
| 7,006,881 | B1 * | 2/2006 | Hoffberg ........ G05B 15/02 700/17 |

(Continued)

*Primary Examiner* — Jonathan V Lewis
(74) *Attorney, Agent, or Firm* — Thomas | Horstemeyer, LLP

(57) ABSTRACT

Disclosed are various embodiments for selecting advertising for presentation to users in association with digital content items. Characteristics of a user are determined based at least in part on historical data that associates the user with one or more items. An advertisement is selected from an inventory of advertisements for presentation in association with a digital content item requested by the user. The advertisement is selected based at least in part on a highest value placed on the characteristics of the user by an advertiser.

20 Claims, 4 Drawing Sheets

(51) Int. Cl.
  *H04N 21/24*      (2011.01)
  *H04N 21/2547*    (2011.01)
  *H04N 21/258*     (2011.01)
  *H04N 21/2668*    (2011.01)
  *H04N 21/442*     (2011.01)
  *H04N 21/478*     (2011.01)

(56) References Cited

U.S. PATENT DOCUMENTS

| | | | |
|---|---|---|---|
| 7,124,091 B1* | 10/2006 | Khoo | G06Q 30/02 348/E7.071 |
| 7,158,959 B1 | 1/2007 | Chickering et al. | |
| 8,239,891 B2 | 8/2012 | Hughes et al. | |
| 8,296,179 B1* | 10/2012 | Rennison | G06Q 30/0251 705/14.53 |
| 8,413,052 B2* | 4/2013 | Roy | G06Q 30/02 715/205 |
| 8,464,302 B1 | 6/2013 | Liwerant et al. | |
| 8,751,302 B2* | 6/2014 | Subramanian | G06Q 30/02 705/14.41 |
| 2003/0154126 A1* | 8/2003 | Gehlot | G06Q 30/02 705/14.53 |
| 2003/0229893 A1* | 12/2003 | Sgaraglino | H04N 21/25883 725/37 |
| 2004/0133469 A1* | 7/2004 | Chang | G06Q 30/0255 705/14.53 |
| 2007/0027744 A1 | 2/2007 | Carson et al. | |
| 2007/0073723 A1* | 3/2007 | Ramer | G06Q 30/02 |
| 2007/0079343 A1 | 4/2007 | Takashimizu et al. | |
| 2008/0022301 A1* | 1/2008 | Aloizos | G06Q 30/02 725/34 |
| 2008/0127245 A1 | 5/2008 | Olds | |
| 2008/0196060 A1 | 8/2008 | Varghese | |
| 2008/0201731 A1 | 8/2008 | Howcroft | |
| 2008/0229354 A1 | 9/2008 | Morris et al. | |
| 2008/0250445 A1 | 10/2008 | Zigmond et al. | |
| 2008/0250450 A1 | 10/2008 | Larner et al. | |
| 2008/0275753 A1* | 11/2008 | Protheroe | G06Q 30/02 705/14.69 |
| 2009/0007171 A1 | 1/2009 | Casey et al. | |
| 2009/0049468 A1 | 2/2009 | Shkedi | |
| 2009/0150920 A1 | 6/2009 | Jones | |
| 2009/0199230 A1 | 8/2009 | Kumar et al. | |
| 2009/0222329 A1* | 9/2009 | Ramer | G06F 17/30749 705/14.52 |
| 2009/0228920 A1 | 9/2009 | Tom et al. | |
| 2009/0240577 A1* | 9/2009 | McAfee | G06Q 30/02 705/14.4 |
| 2009/0265245 A1* | 10/2009 | Wright | G06Q 30/02 705/14.66 |
| 2010/0063877 A1* | 3/2010 | Soroca | G06F 17/30749 705/14.45 |
| 2010/0121671 A1* | 5/2010 | Boutilier | G06Q 10/087 705/7.33 |
| 2011/0078001 A1 | 3/2011 | Archer et al. | |
| 2011/0078726 A1* | 3/2011 | Rosenberg | G06Q 30/02 725/34 |
| 2011/0082735 A1 | 4/2011 | Kannan et al. | |
| 2011/0231264 A1* | 9/2011 | Dilling | G06Q 30/02 705/14.71 |
| 2011/0239243 A1 | 9/2011 | Dierks et al. | |
| 2011/0313857 A1* | 12/2011 | Nice | G06Q 30/02 705/14.53 |
| 2012/0042338 A1* | 2/2012 | Kitts | H04N 21/25866 725/35 |
| 2012/0054012 A1* | 3/2012 | Mesaros | G06Q 10/08 705/14.23 |
| 2012/0110616 A1 | 5/2012 | Kilar et al. | |
| 2012/0143674 A1* | 6/2012 | Ziskrout | G06Q 30/0244 705/14.43 |
| 2012/0323674 A1* | 12/2012 | Simmons | G06Q 30/02 705/14.41 |
| 2014/0046777 A1* | 2/2014 | Markey | G06Q 30/0269 705/14.66 |
| 2015/0127473 A1* | 5/2015 | Simhon | G06F 17/30867 705/14.71 |
| 2015/0143414 A1* | 5/2015 | Bentolila | G06Q 30/0251 725/34 |

* cited by examiner

SELECTING ADVERTISING FOR PRESENTATION WITH DIGITAL CONTENT

CROSS-REFERENCE TO RELATED APPLICATIONS

This application is a continuation of, and claims priority to, co-pending U.S. patent application entitled "SELECTING ADVERTISING FOR PRESENTATION WITH DIGITAL CONTENT," filed on Oct. 29, 2010, and assigned application Ser. No. 12/915,518, which is incorporated herein by reference in its entirety.

BACKGROUND

Advertising that is presented with television programs is sold based on how many people are predicted to view the television program along with the predicted demographics of the viewers. Companies such as Nielsen® provide ratings and demographics information based on a selected sample of viewers. An advertiser may choose to advertise during a television program based on past performance of the program with a targeted demographic.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to selecting advertising for presentation to customers in association with digital content items such as, for example, streaming video, video downloads, streaming audio, audio downloads, images, etc. According to various embodiments of the present disclosure, advertising is sold based on the characteristics of a customer who has requested a digital content item. The characteristics of the customer may be determined from historical data accumulated through interactions of the customer with an electronic marketplace, or an online presence of one or more merchants. An advertiser may place a value on certain characteristics in order to target advertisements toward customers having those characteristics. Content providers may present to the customer the advertisements that have the highest value given the characteristics of the customer. Accordingly, advertising sales may be driven independently from what content is requested by the customer. In the following discussion, a general description of the system and its components is provided, followed by a discussion of the operation of the same.

Figure 1:
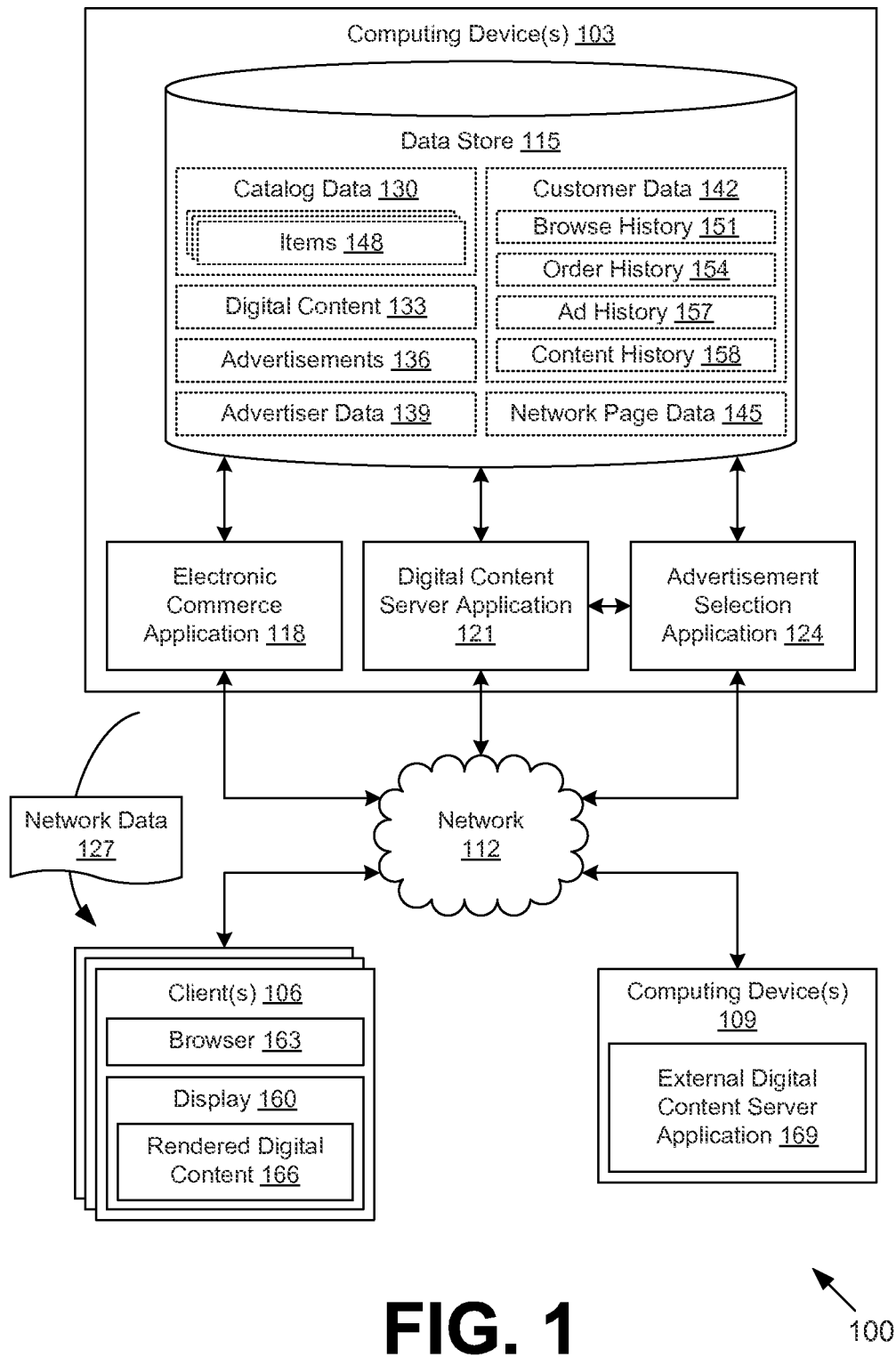
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and one or more computing devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include an electronic commerce application 118, a digital content server application 121, an advertisement selection application 124, and other applications, services, processes, systems, engines, or functionality not discussed in detail herein. The electronic commerce application 118 is executed in order to facilitate the online purchase of items over the network 112. The electronic commerce application 118 also performs various backend functions associated with the online presence of one or more merchants in order to facilitate the online purchase of items. For example, the electronic commerce application generates network data 127 such as web pages or other types of network content that are provided to clients 106 for the purposes of selecting items for purchase, rental, download, lease, or other form of consumption. The electronic commerce application 118 may be configured to record interactions with customers relating to purchases of items, searching or browsing for items, and so on.

The digital content server application 121 is executed to serve up content from a digital library of content. In one embodiment, the content may be streamed to a client 106, where the client 106 will present the content to a user as it is received. In another embodiment, the client 106 may download content from the digital content server application 121 such that the content may be presented at some future time. The advertisement selection application 124 is executed to select advertisements from an inventory of advertisements to be presented to customers in conjunction with digital content items. The advertisement selection application 124 is configured to select the advertisements based at least in part on historical data associated with the customer.

The electronic commerce application 118 and the digital content server application 121 may include shared or separate network data servers to serve up network data 127 over the network 112. Such network data servers may include commercially available hypertext transfer protocol (HTTP) servers such as, for example, Apache® HTTP Server, Apache® Tomcat®, Microsoft® Internet Information Services (IIS), and so on. While the digital content server application 121 may be configured to serve up digital content 133 and advertisements 136 by way of HTTP in some embodiments, other network protocols may be used in other embodiments. For example, it may be advantageous to send streaming content over the network 112 by way of user datagram protocol (UDP), real-time transport protocol (RTP), real-time streaming protocol (RTSP), and/or other network protocols.

The data stored in the data store 115 includes, for example, catalog data 130, digital content 133, advertisements 136, advertiser data 139, customer data 142, network page data 145, and potentially other data. The catalog data 130 includes data regarding a plurality of items 148 that are offered to customers through an electronic marketplace of one or more merchants. An item 148 may correspond to any good, product, service, software item, multimedia item, or other item that may be offered for sale, purchase, download, lease, or any other form of consumption as can be appreciated. Each item 148 may include various data such as, for example, title, description, price, weight, customer reviews, categories, quantities, conditions, options, and/or other data.

The digital content 133 refers to a library of digital content items that may be made available to clients 106 by way of the network 112. As non-limiting examples, the digital content 133 may include video, audio, images, and/or other forms of content. The digital content 133 may include various types of video such as movies, television programs, clips, and so on. The digital content 133 may include various types of audio such as radio broadcasts, music events, songs, clips, and so on. The digital content 133 may be configured to be delivered as a stream, a download, or through some other form of delivery. The digital content 133 may be produced by professionals, novices, and/or people with other levels of experience. Some digital content items may be associated with various licensing costs for the content provider, while other digital content items may be free for the content provider.

The advertisements 136 refer to promotional items that may be presented to customers at clients 106 in association with digital content items. To this end, the advertisements 136 may include video, audio, animations, graphics, images, and/or other forms of digital advertising. Typically, advertisements 136 are crafted to promote a particular product, family of products, service, company, person, cause, etc.

Advertiser data 139 includes various data relating to advertisers who are willing to pay for the advertisements 136 to be presented to customers. For example, the advertiser data 139 may include an account representing an amount of currency charged to the advertiser for presentations of advertisements 136, or an amount remaining from funds deposited to cover presentations of advertisements 136. The advertiser data 139 may include various rules configured by advertisers to govern the presentations of their respective advertisements 136. As a non-limiting example, an advertiser may specify that its advertisements 136 are not to be shown in conjunction with digital content 133 corresponding to movies rated "R" or other digital content 133 directed to mature audiences only. As another non-limiting example, an advertiser may specify that its advertisements are to be shown to customers meeting certain characteristics.

The customer data 142 includes various data relating to particular customers of the electronic marketplace. The data may be accumulated from a history of interactions of the customer with the electronic marketplace. To this end, the customer data 142 may include a browse history 151, an order history 154, an ad history 157, a content history 158, and/or other data.

The browse history 151 may represent items 148 that the customer has searched for, categories of items 148 browsed, network pages about items 148 visited by the customer, and/or other data that may associate customers with preferences for certain types of items 148. The order history 154 may include a history of orders for items 148 placed by the customer through the electronic marketplace. Various other information may be aggregated about a customer in the customer data 142 through the browse history 151 and order history 154 such as, for example, addresses, spending history, estimated income, estimated age, family demographics, hobbies, interests, pets, other demographic data, and so on. Such information may be correlated with the customer from external data sources in some embodiments.

The ad history 157 may track the presentation history of advertisements 136 to particular customers. The ad history 157 may track when an advertisement 136 has been scheduled for presentation to a customer. Additionally, the ad history 157 may track when an advertisement 136 has actually been presented to a customer. In one embodiment, the ad history 157 may also track whether the advertisement 136 had focus on the client 106 when shown, played back, or otherwise presented on the client 106. The content history 158 may include a history of digital content items that have been requested and/or viewed by the customer. The content history 158 may also describe content subscriptions of a customer.

The network page data 145 may include various data used in generating the network data 127 corresponding to network pages. As non-limiting examples, the network page data 145 may include code, templates, text, graphics, images, audio, video, multimedia, and/or any other data used in generating network pages embodied in the network data 127. It is noted that the network data 127 need not correspond to network pages. For example, the network data 127 may correspond to digital content 133, advertisements 136, menus for selecting digital content 133, and other forms of data sent over a network 112 to support the functionality described herein.

The client 106 is representative of a plurality of client devices that may be coupled to the network 112. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages, such as web pages, or other network content served up by the computing device 103 and/or other servers, thereby generating one form of rendered digital content 166 on the display 160. The rendered digital content 166 may also include digital content 133 and advertisements 136. The client 106 may be configured to execute applications beyond browser 163 such as, for example, music players, video players, email applications, instant message applications, and/or other applications.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise a cloud computing resource, a grid computing resource, and/or any other distributed computing arrangement. Such computing devices 109 may be located in a single installation or may be distributed among many different geographical locations. For purposes of convenience, the computing device 109 is referred to herein in the singular. Even though the computing device 109 is referred to in the singular, it is understood that a plurality of computing devices 109 may be employed in the various arrangements as described above.

Various applications and/or other functionality may be executed in the computing device 109 according to various embodiments. Also, various data may be stored in a data store that is accessible to the computing device 109. The components executed on the computing device 109, for example, include an external digital content server application 169, and other applications, services, processes, systems, engines, or functionality not discussed in detail herein. The external digital content server application 169 is executed to provide items of digital content 133 and advertisements 136 to clients 106. The external digital content server application 169 may include a network data server to serve up network data 127 over the network 112.

Next, a general description of the operation of the various components of the networked environment 100 is provided. To begin, a customer interacts with an electronic marketplace that is hosted through the electronic commerce application 118. The customer may browse various network pages of the electronic marketplace, which may include detail network pages, category network pages, search network pages, and so on. The customer may enter various search queries for items 148 sought. These browse interactions may be uniquely associated with the customer using browser 163 cookies, internet protocol (IP) addresses, registration of a customer account, authentication of the customer using the customer account, and so on. The browse interactions may take place across numerous sessions and potentially different clients 106 and may occur over an extended period of time. The electronic commerce application 118 may record these browse interactions as the browse history 151 for the customer.

In addition, the customer may order items 148 that are offered through the electronic marketplace. The customer may place numerous orders for different items 148 over a period of time. In ordering the items 148, the customer may provide various information such as name, address, payment instruments, etc. The customer may also create various lists of items 148 such as wish lists, shopping carts, and other lists. Consequently, the electronic commerce application 118 may learn a great deal about the customer. Moreover, the information expressly gathered by the electronic commerce application 118 during the course of the ordering process may be augmented by other data that can be correlated to the identity of the customer. The information relating to the orders of the customer may be stored in the order history 154. Furthermore, a customer may view or request digital content items through a network site. Such interactions may be recorded in the content history 158 in the data store 115.

Advertisers typically place advertising in association with content that is predicted to have a certain demographic. For instance, a baby diaper company may choose to place ads during a television program that is predicted to have a large parental viewing audience. Such predictions are made with regard to samples of audiences or may merely be guesses based on who the advertiser thinks would be interested in viewing the content. However, such predictions are very imprecise, and people of different demographic groups may be interested in the same content. Thus, an advertiser may end up wasting impressions, or advertising presentations, on viewers who are not interested in what is being advertised.

With all of the information that the merchant(s) or other network site operators have collected regarding the customer through the electronic marketplace and/or another network site, very precise targeting of advertising may be achieved. This can enable the merchant(s) or other parties to offer advertising-supported digital content 133 to customers. The digital content 133 may be premium content for which licensing is paid or free content that does not require licensing. In many instances, the identity of the digital content 133 is not significant to the advertiser. Instead, the identity of the customer is significant. Because so much is known about the customers, an advertiser may be willing to pay a higher rate for each presentation of an advertisement 136. Advertising prices are typically quoted in cost-per-mille (CPM), which is cost per thousand impressions.

An advertiser may interact with the advertisement selection application 124 to configure various approaches for selecting advertisements 136 for presentation to customers. The advertiser may specify characteristics of the customers who are to be presented its advertisements 136. The characteristics of the customers are determined through an analysis of the customer data 142. Characteristics such as age, income, geographic location, interests, hobbies, family size, gender, etc. may be considered for selecting advertising. Furthermore, characteristics such as items 148 previously purchased or viewed through the electronic marketplace may be considered. Rates may be competitively established by multiple advertisers based on what the advertisers are willing to pay given the specificity of the customer characteristics.

As a non-limiting example, a baby diaper company may pay a high rate for its advertisement 136 to be presented to parents. However, the company may pay an even higher rate for its advertisement to be presented to parents who have viewed or ordered diapers from the electronic marketplace within the last three months. Generally, in various embodiments, the identity of the digital content 133 that is consumed by the targeted customer may be disregarded. Indeed, advertisements 136 may be selected irrespective of the digital content items presented to the target customers in some embodiments.

Nevertheless, advertisers, as a practical matter, may request that their advertisements 136 not be presented along with digital content 133 that some may find objectionable. Additionally, the type of digital content 133 presented may be relevant to what the advertiser is willing to pay for the advertisement 136. For example, a golf equipment manufacturer may be willing to pay a higher price for its advertisements 136 to be presented along with a golf tournament television program to a customer identified as a golfer than along with some other unrelated program to the same customer. This may be, for example, because the golfer may be more likely to buy the golf equipment promoted by the advertisement 136 when it is shown in conjunction with the golf tournament. The various rules for the advertisements 136 and the prices that the advertiser is willing to pay are configured in the advertiser data 139.

A customer at a client 106 may access the digital content 133 over the network 112. Various network pages in the network data 127 may be presented to the customer to enable the customer to browse the library of digital content 133 and select a digital content item for presentation. The library of digital content 133 may be made available through a variety of embodiments of clients 106, such as, for example, set-top boxes, electronic book readers, etc. The customer may be identified to the digital content server application 121 through an explicit log-in process, cookies from a browser 163, or another medium of identification. The digital content server application 121 is then able to access the stored customer data 142 associated with the customer.

When a customer requests a digital content item, one or more advertisements 136 may be selected for presentation in conjunction with the digital content item. As a non-limiting example, where the digital content item is a streaming movie, various advertisements 136 that are video clips may be embedded in the streaming movie. As another non-limiting example, where the digital content item is a streaming movie, various advertisements 136 that include text and links to network sites of advertisers may be shown superimposed on or adjacent to the streaming movie. As yet another non-limiting example, where the digital content item comprises streaming audio, various advertisements 136 that are audio clips may be embedded in the audio. It is understood that advertisements 136 may be presented in association with digital content 133 in many different forms.

The advertisement selection application 124 selects one or more advertisements 136 from the inventory of advertisements 136 for presentation with the digital content item requested by the customer based at least in part on the advertiser data 139. In particular, the advertisement selection application 124 determines various characteristics of the customer based, for example, on the browse history 151, the order history 154, the content history 158, and/or other data of the customer. The advertisement selection application 124 then determines which advertisement 136 is the highest value advertisement 136 in the inventory given the characteristics of the customer. In other words, the advertisement selection application 124 determines the advertisement 136 having the highest price that an advertiser is willing to pay for a presentation of the advertisement 136 to the customer according to the characteristics of the customer. Where multiple advertisements 136 are to be selected for presentation with a digital content item, the advertisements 136 having the highest values may be selected.

Other factors may also impact selection of advertisements 136. The advertisement selection application 124 may be configured to record presentations of particular advertisements 136 to particular customers in an ad history 157 associated with the customer. It may be desirable not to repeat an advertisement 136 more than a certain number of times within a predefined time period. Thus, the advertisement selection application 124 may be configured not to repeat an advertisement 136 even though it may have the highest value. In one embodiment, it may be configured that the price that the advertiser is willing to pay depends in part on a number of times that the advertisement 136 has been presented to the customer. Additionally, an advertiser may configure its advertisement 136 not to be selected for presentation with certain types of digital content 133 such as, for example, digital content 133 for mature audiences only, etc. Further, an advertiser may be willing to pay a higher price for its advertisement 136 to be selected for presentation with certain types of digital content 133 such as, for example, digital content 133 that is especially relevant to products promoted in the advertisement, etc. However, it is noted that, in some embodiments, selection of advertisements 136 may be irrespective of the digital content 133 and predicted aggregate demographics for consumers of the digital content 133.

Because the advertisements 136 may be selected according to the characteristics of the customer, it is important that the characteristics are determined accurately. Customers may have items 148 in their browse history 151 that they have no intention of ordering. Similarly, customers may have items 148 in their order history 154 that they have no intention of ordering again. There are many explanations for such situations. For example, a guest may be using the browser 163 of the customer and generating a browse history 151 that should not be tied to the customer. Consequently, the electronic commerce application 118 and/or the digital content server application 121 may provide a facility for excluding items 148 and/or other information from the browse history 151 and the order history 154 to ensure that such items 148 and/or information is not used in selecting advertisements 136. Further, the digital content server application 121 may provide a facility for the customer to indicate which advertisements 136 or categories of advertisements 136 should not be presented to the customer.

In one embodiment, a customer may access content through an external digital content server application 169 on a computing device 109. The computing device 109 may be under control of a different party than the electronic marketplace. However, the advertisement selection application 124 may be configured to provide a selection of advertisements 136 for presentation with digital content 133 served up by the external digital content server application 169. To this end, the advertisements 136 themselves may be provided over the network 112 by the digital content server application 121 to the external digital content server application 169 or to the clients 106 directly. Alternatively, an indication of which advertisements 136 are to be selected may be provided to the external digital content server application 169.

It may be the case that some of the data and functionality represented in the computing device 103 may be in the computing device 109 additionally or instead. In various embodiments, any or all of the catalog data 130, digital content 133, advertisements 136, advertiser data 139, and/or other data may be stored in the computing device 109. In various embodiments, the advertisement selection application 124 may be executed in the computing device 109. In one embodiment, the computing device 103 may execute an application to serve up portions of the customer data 142 as network data 127 to an advertisement selection application 124 executed in the computing device 109.

The digital content 133 requested by the customer at a client 106 is presented to the customer though network data 127 sent by either the digital content server application 121 or the external digital content server application 169. The selected advertisements 136 are also sent as network data 127 for presentation in association with the digital content 133. The digital content 133 and the selected advertisements 136 are presented to the customer on the display 160 as rendered digital content 166 by the browser 163 and/or other applications executed in the client 106.

Figure 2:
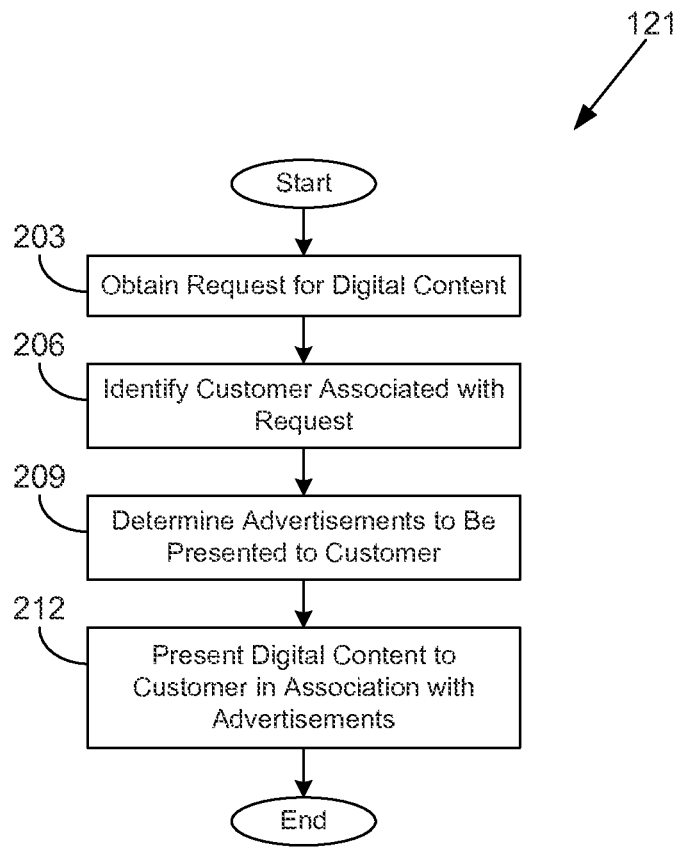
FIG. 2 is a flowchart illustrating one example of functionality implemented as portions of a digital content server application executed in a computing device in the networked environment of FIG. 1 according to various embodiments of the present disclosure.

Referring next to FIG. 2, shown is a flowchart that provides one example of the operation of a portion of the digital content server application 121 according to various embodiments. It is understood that the flowchart of FIG. 2 provides merely an example of the many different types of functional arrangements that may be employed to implement the operation of the portion of the digital content server application 121 as described herein. As an alternative, the flowchart of FIG. 2 may be viewed as depicting an example of steps of a method implemented in the computing device 103 (FIG. 1) according to one or more embodiments.

Beginning with box 203, the digital content server application 121 obtains a request for a digital content item in the library of digital content 133 (FIG. 1) over the network 112 (FIG. 1) from a client 106 (FIG. 1). In box 206, the digital content server application 121 identifies a customer associated with the request. As a non-limiting example, the customer may authenticate with the digital content server application 121 by supplying username and password and/or other security credentials. Additionally, a customer may be identified by way of address on the network 112, cookies stored in the browser 163 (FIG. 1), and/or other approaches to identification.

Next, in box 209, the digital content server application 121 determines one or more advertisements 136 (FIG. 1) to be presented to the customer in association with the digital content 133. The selected advertisements 136 may be determined by the advertisement selection application 124 (FIG. 1). An example of an implementation of portions of the advertisement selection application 124 is illustrated in the flowchart of FIG. 3.

In box 212, the digital content server application 121 presents the digital content 133 to the customer in association with the advertisements 136. For instance, the advertisements 136 may be embedded in the digital content 133, displayed adjacent to the digital content 133, overlaid on top of the digital content 133, and/or presented in some other way. In one embodiment, when the advertisement(s) 136 are presented, the digital content server application 121 may record the presentations in the ad history 157 (FIG. 1) of the customer. Thereafter, the portion of the digital content server application 121 ends.

Figure 3:
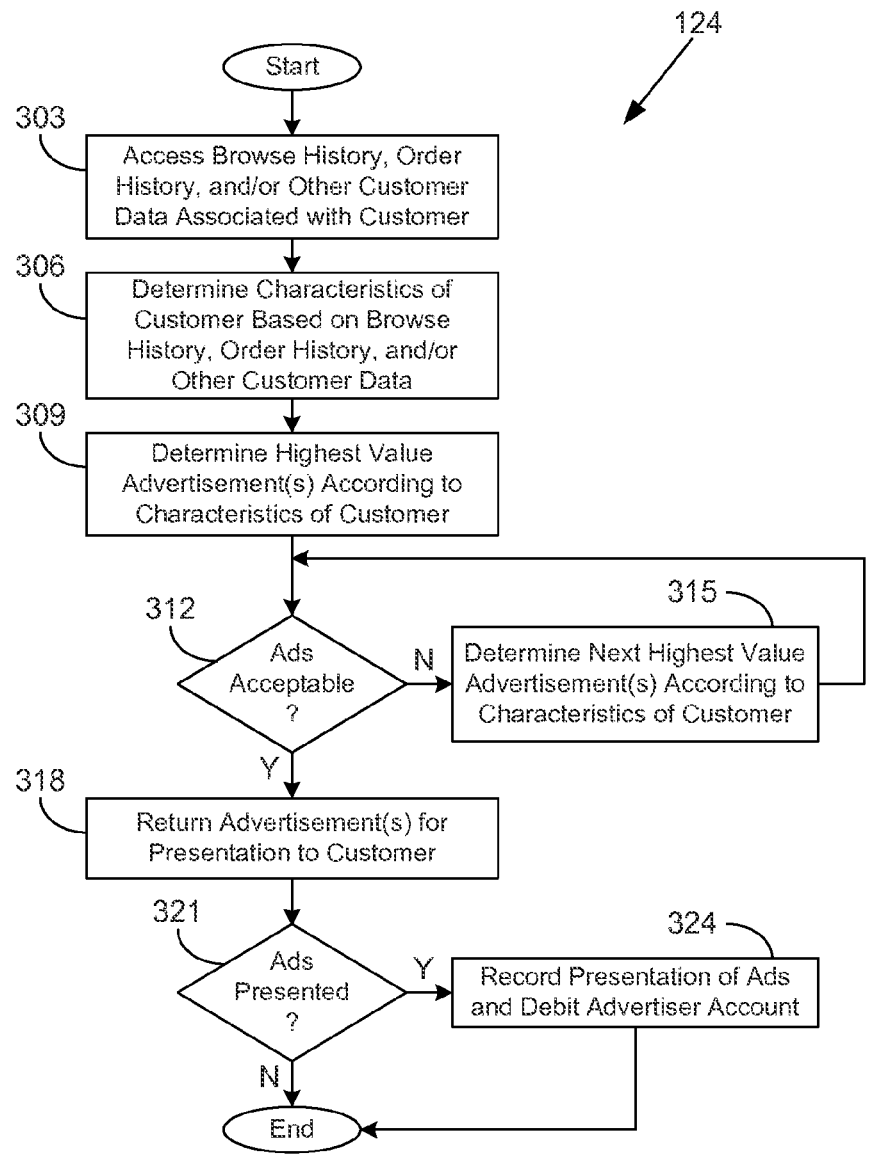
FIG. 3 is a flowchart illustrating one example of functionality implemented as portions of an advertisement selection application executed in a computing device in the networked environment of FIG. 1 according to various embodiments of the present disclosure.

Moving on to FIG. 3, shown is a flowchart that provides one example of the operation of a portion of the advertisement selection application 124 according to various embodiments. It is understood that the flowchart of FIG. 3 provides merely an example of the many different types of functional arrangements that may be employed to implement the operation of the portion of the advertisement selection application 124 as described herein. As an alternative, the flowchart of FIG. 3 may be viewed as depicting an example of steps of a method implemented in the computing device 103 (FIG. 1) according to one or more embodiments.

Beginning with box 303, the advertisement selection application 124 accesses the browse history 151 (FIG. 1), order history 154 (FIG. 1), and/or other data in the customer data 142 (FIG. 1) associated with a given customer. In box 306, the advertisement selection application 124 determines characteristics of the customer based on the browse history 151, the order history 154, and/or other data in the customer data 142. For example, the advertisement selection application 124 may determine items 148 (FIG. 1) or categories of items 148 frequently browsed for or ordered by the customer through the electronic commerce application 118 (FIG. 1) of an electronic marketplace. The advertisement selection application 124 may determine addresses where the customer has had orders shipped, the age of the customer, the income of the customer, the gender of the customer, and/or other characteristics of the customer from the customer data 142.

In box 309, the advertisement selection application 124 determines the highest value advertisements 136 (FIG. 1) according to the characteristics of the customer. In other words, the advertisement selection application 124 determines the advertisements 136 for which advertisers are willing to pay the highest price for an impression given the characteristics of the particular customer. Thus, advertisements 136 may be highly targeted depending on what characteristics are desired by advertisers. The rules and/or selection criteria may be stored in the advertiser data 139 (FIG. 1).

In box 312, the advertisement selection application 124 determines whether the selected advertisements 136 are acceptable. For example, an advertisement 136 may not be acceptable based on the digital content item requested by the customer, the time elapsed since the last presentation of the advertisement 136, other advertisements 136 that are selected, and/or other factors. If the advertisement(s) 136 are unacceptable, the advertisement selection application 124 moves to box 315 and determines the next highest value advertisement(s) according to the characteristics of the customer. From there, the advertisement selection application 124 returns to box 312.

If the advertisement selection application 124 instead determines in box 312 that the selected advertisement(s) 136 are acceptable, the advertisement selection application 124 transitions to box 318 and returns the advertisement(s) 136 for presentation to the customer. Next, in box 321, the advertisement selection application 124 determines whether the advertisement(s) 136 were, in fact, presented to the customer. If the advertisement(s) 136 were actually presented to the customer, the advertisement selection application 124 moves to box 324 and records the presentation of the advertisement(s) 136. In some embodiments, the advertisement selection application 124 may also debit or charge a cost for the impression/presentation to an account associated with the advertiser in the advertiser data 139. Thereafter, the portion of the advertisement selection application 124 ends.

Figure 4:
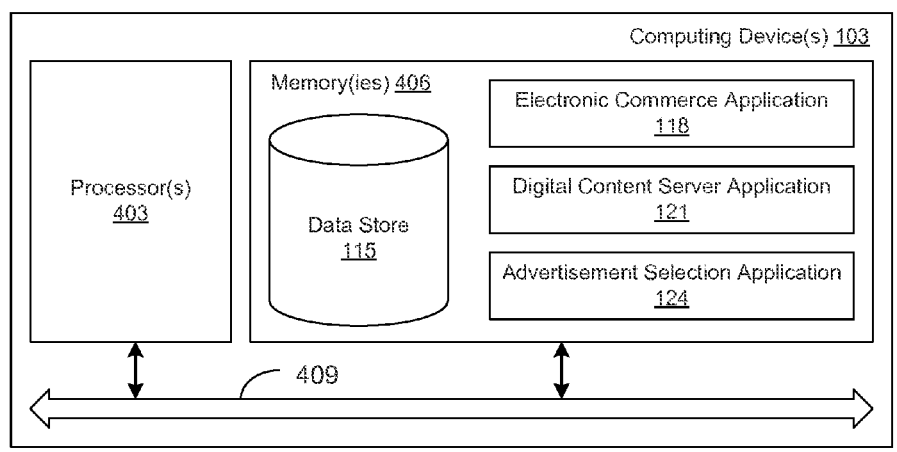
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce application 118, the digital content server application 121, the advertisement selection application 124, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 112 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce application 118, the digital content server application 121, the advertisement selection application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the digital content server application 121 and the advertisement selection application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 118, the digital content server application 121, and the advertisement selection application 124, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore the following is claimed:

1. A method comprising:
    maintaining, by at least one computing device, a browse history associated with a user based at least in part on a plurality of network pages of an electronic marketplace that have been requested by the user, at least some of the plurality of network pages featuring products offered for sale through the electronic marketplace;
    maintaining, by the at least one computing device, an order history associated with the user based at least in part on a plurality of products purchased by the user through the electronic marketplace;
    obtaining, by the at least one computing device, a request by the user for a presentation of a digital content item from a digital content library;
    determining, by the at least one computing device, a plurality of characteristics of the user based at least in part on the browse history and the order history;
    assigning, by the at least one computing device, values to a plurality of advertisements from an inventory of advertisements given the determined plurality of characteristics of the user;
    selecting, by the at least one computing device, an advertisement from the plurality of advertisements that is assigned a value that matches a price an advertiser is willing to pay for a presentation of the advertisement to the user, the advertisement being selected irrespective of aggregate demographics associated with the digital content item; and
    presenting, by the at least one computing device, the digital content item to the user in association with the advertisement.

2. The method of claim 1, wherein at least one advertisement in the inventory of advertisements is excluded from possible selection based at least in part on the digital content item.

3. A system, comprising:
    at least one computing device; and
    an advertisement selection application executable in the at least one computing device, the advertisement selection application configured to at least:
        determine a plurality of characteristics of a user based at least in part on historical data that associates the user with at least one item;
        assign values to a plurality of advertisements from an inventory of advertisements given the determined plurality of characteristics of the user; and
        select an advertisement from the plurality of advertisements for presentation in association with a digital content item requested by the user, the advertisement being selected based at least in part on a highest value placed on the plurality of characteristics of the user by an advertiser for a presentation of the advertisement to the user.

4. The system of claim 3, wherein the advertisement is selected irrespective of predicted aggregate demographics associated with the digital content item.

5. The system of claim 3, wherein the user corresponds to a user of a network site, and the at least one item is offered on the network site.

6. The system of claim 3, wherein the advertisement is selected based at least in part on a time elapsed since a last presentation of the advertisement to the user.

7. The system of claim 3, wherein the advertisement selection application is further configured to disregard at least some of the historical data in determining the plurality of characteristics of the user in response to a request by the user.

8. The system of claim 3, wherein the historical data includes data regarding a plurality of network pages visited by the user in an electronic marketplace, the plurality of network pages describing the at least one item which is offered by the electronic marketplace.

9. The system of claim 3, wherein the historical data includes data regarding a plurality of items ordered by the user in an electronic marketplace or an amount spent by the user in the electronic marketplace.

10. The system of claim 3, wherein the historical data includes data regarding a location of the user.

11. The system of claim 3, wherein the historical data includes a user-created list of items that the user is interested in acquiring.

12. The system of claim 3, wherein the digital content item includes a video stream, and the advertisement selection application is further configured to at least embed the advertisement in the video stream.

13. The system of claim 12, wherein the advertisement includes a video.

14. The system of claim 12, wherein the advertisement includes an overlay for the video stream.

15. The system of claim 3, wherein the advertisement selection application is further configured to at least send an identification of the advertisement to another computing device configured to serve the digital content item to the user.

16. A method comprising:
    maintaining, in at least one computing device, a history of interactions of a user with an online presence of at least one merchant, the history of interactions indicating a preference of the user for at least one product from a product catalog of the at least one merchant;
    assigning, by the at least one computing device, values to a plurality of advertisements from an inventory of advertisements given the history of interactions of the user;
    selecting, by the at least one computing device, an advertisement from the plurality of advertisements that is assigned a value that matches a price that an advertiser is willing to pay for a presentation of the advertisement to the user; and
    presenting, by the at least one computing device, the advertisement in association with a digital content item requested by the user.

17. The method of claim 16, wherein the history of interactions further includes a purchase history.

18. The method of claim 16, wherein the history of interactions further includes a network page view history.

19. The method of claim 16, wherein the advertisement is selected from the inventory of advertisements irrespective of demographic data associated with other consumers of the digital content item.

20. The method of claim 16, wherein the advertisement is selected from the inventory of advertisements irrespective of the digital content item.

* * * * *